United States Patent
Ikeda et al.

(10) Patent No.: US 7,415,339 B2
(45) Date of Patent: Aug. 19, 2008

(54) VEHICLE ACCESSORY ADJUSTING SYSTEM AND METHOD OF ADJUSTING VEHICLE ACCESSORY

(75) Inventors: Hirotane Ikeda, Nagoya (JP); Kimiaki Tanaka, Kariya (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 11/484,738

(22) Filed: Jul. 12, 2006

(65) Prior Publication Data

US 2007/0021893 A1 Jan. 25, 2007

(30) Foreign Application Priority Data

Jul. 22, 2005 (JP) ............... 2005-213268

(51) Int. Cl.
*B60R 22/00* (2006.01)
(52) U.S. Cl. .......................... 701/49; 701/36
(58) Field of Classification Search ............... 701/49, 701/36; 340/426.34, 438
See application file for complete search history.

(56) References Cited

U.S. PATENT DOCUMENTS 6,785,595 B2 * 8/2004 Kominami et al. ............ 701/36
2003/0152088 A1 * 8/2003 Kominami et al. .......... 370/401
2005/0085965 A1 * 4/2005 Issa et al. ...................... 701/35
2007/0038345 A1 * 2/2007 Heider et al. ................. 701/32

FOREIGN PATENT DOCUMENTS

| JP | A-11-312291 | | 11/1999 |
| JP | 2002-120670 | | 4/2002 |
| JP | 2002-120671 | | 4/2002 |
| WO | WO2004074047 | * | 9/2004 |

\* cited by examiner

*Primary Examiner*—Mark Hellner
(74) *Attorney, Agent, or Firm*—Nixon & Vanderhye P.C.

(57) ABSTRACT

A vehicle accessory adjusting system that adjusts a variety of on-vehicle accessories of a vehicle to suit a driver or a passenger according to personal data stored in an IC card or other portable data storage medium. The vehicle accessory adjusting system includes a memory that stores standard setting data on the on-vehicle accessories, calculation circuit for calculating personal data based on specific setting data obtained when a driver or a passenger uses some on-vehicle accessories and corresponding standard setting data of the on-vehicle accessories, a rewriting unit to rewrite the personal data stored in the IC card with new personal data; and setting circuit to set the on-vehicle accessories according to the personal data stored in the IC card and the standard setting data stored in the memory.

12 Claims, 8 Drawing Sheets

| SEAT \ TYPE OF VEHICLE | A | B | C |
|---|---|---|---|
| POSITION X | AX(+10) | BX(+20) | CX(−10) |
| HEIGHT Y | AY(+5) | BY(+10) | CY(−5) |
| ANGLE Z | AZ(−5) | BZ(0) | CZ(+5) |

| MIRROR \ TYPE OF VEHICLE | A | B | C |
|---|---|---|---|
| R-MIRROR U | AU(+5) | BU(+10) | CU(0) |
| R-S MIRROR V | AV(+10) | BV(+20) | CV(+5) |
| L-S MIRROR W | AW(0) | BW(+10) | CW(−5) |

FIG. 7
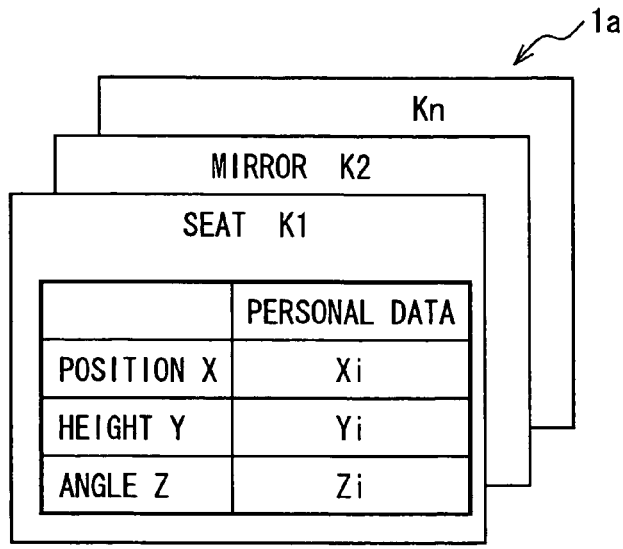
FIG. 10
| SEAT | MODE 1 | MODE 2 | MODE 3 | MODE 4 |
|---|---|---|---|---|
| POSITION X | $Xi1$ | $Xi2$ | $Xi3$ | $Xi4$ |
| HEIGHT Y | $Yi1$ | $Yi2$ | $Yi3$ | $Yi4$ |
| ANGLE Z | $Zi1$ | $Zi2$ | $Zi3$ | $Zi4$ |
FIG. 12
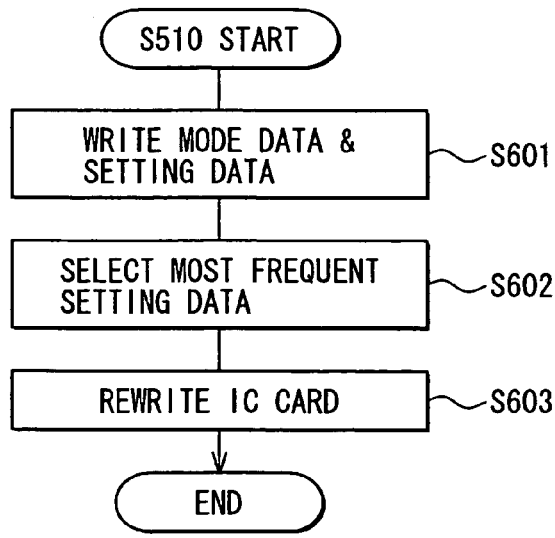

VEHICLE ACCESSORY ADJUSTING SYSTEM AND METHOD OF ADJUSTING VEHICLE ACCESSORY

CROSS REFERENCE TO RELATED APPLICATION

The present application is based on and claims priority from Japanese Patent Application 2005-213268, filed Jul. 22, 2005, the contents of which are incorporated herein by reference.

BACKGROUND OF THE INVENTION

1. Field of the Invention

The present invention relates to a vehicle accessory adjusting system that is associated with a portable storage medium to enable various settings of accessories mounted in a vehicle and, particularly, a vehicle accessory adjusting system common to a plurality of types of vehicles, to which the same portable storage medium can be applicable. The present invention also relates to a method of adjusting vehicle accessories of a variety of types of vehicles.

2. Description of the Related Art

JP-A-2002-120670 discloses an accessory adjusting system in which a personal data storing IC card is used to set various on-vehicle accessories when a driver is going to drive a vehicle. For example, when he is going to drive a lease car or a rent-a-car, he sets an IC card to the system, thereby adjusting various driving circumstances, such as a seat position or mirror positions, to him.

In the above system, it is necessary to store the IC card setting data that correspond to a specific type of vehicle, such as a sedan type, a wagon type, a sport type, etc. If the IC card for one specific type of vehicle is used to set a system of a different type of vehicle, it is difficult or impossible to adjust driving circumstances to him.

Otherwise, it is necessary to store into the IC card a large amount of setting data that include various types of vehicles, so that the IC card must have a too large memory capacity.

SUMMARY OF THE INVENTION

Therefore, an object of the invention is to provide an improved vehicle accessory adjusting system in which an IC card or other portable storage medium is available to various types of vehicles without increasing the storage capacity thereof.

According to a main feature of the invention, a vehicle accessory adjusting system includes a memory means for storing standard setting data on the on-vehicle accessories, calculation means for calculating personal data based on specific setting data obtained when the individual uses the on-vehicle accessories and the stored standard setting data that correspond to the on-vehicle accessories, rewriting means for rewriting data stored in a IC card with the personal data; and setting means for setting the on-vehicle accessories according to the personal data stored in the portable storage medium and the standard setting data.

Therefore, it is not necessary for the IC card to store a large amount of data.

In the above constructed vehicle accessory adjusting system, the memory means may store standard setting data for different types of vehicles that correspond to the on-vehicle accessories. In this case, the calculation means calculates specific offset values of the specific setting data relative to the corresponding standard setting data as the personal data.

In the above vehicle accessory adjusting system, the on-vehicle accessories may be a vehicle seat operating unit and a vehicle mirror operating unit.

The above constructed vehicle accessory adjusting system may further include a drive-condition-mode-sensors. In this case, the memory means stores standard setting data that correspond to drive condition modes, and the setting means sets the on-vehicle accessories according to the personal data stored in the portable storage medium, the standard setting data and the drive condition modes. This accessory adjusting system may include history memory means for memorizing data on the drive condition modes and corresponding setting data in a chronological order; and selection means for selecting setting data that correspond to one of the drive condition modes. The selection means preferably selects the most frequently applied setting data.

According to another feature of the invention, a method of adjusting a plurality of on-vehicle accessories of a vehicle to suit an individual according to personal data stored in an IC card. The method includes steps of: storing standard setting data on the on-vehicle accessories into a memory disposed in a vehicle; calculating personal data based on specific setting data obtained when the individual uses at least one of the on-vehicle accessories and one of the stored standard setting data that correspond to the at least one of the on-vehicle accessories; rewriting the personal data stored in the portable data storage medium with the personal data; and setting the on-vehicle accessories according to the personal data stored in the portable storage medium and the standard setting data.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 7 illustrates data tables stored in the IC card's memory;

FIG. 10 illustrates data tables stored in the IC card;

FIG. 12 is a flow diagram showing a rewriting process of a memory of an IC card to be used for the accessory adjusting system according to the fourth embodiment of the invention.

DETAILED DESCRIPTION OF THE PREFERRED EMBODIMENTS

The invention will be described with reference to the appended drawings.

A vehicle accessory adjusting system according to the first embodiment of the invention will be described with reference to FIGS. 1-8.

Figure 1:
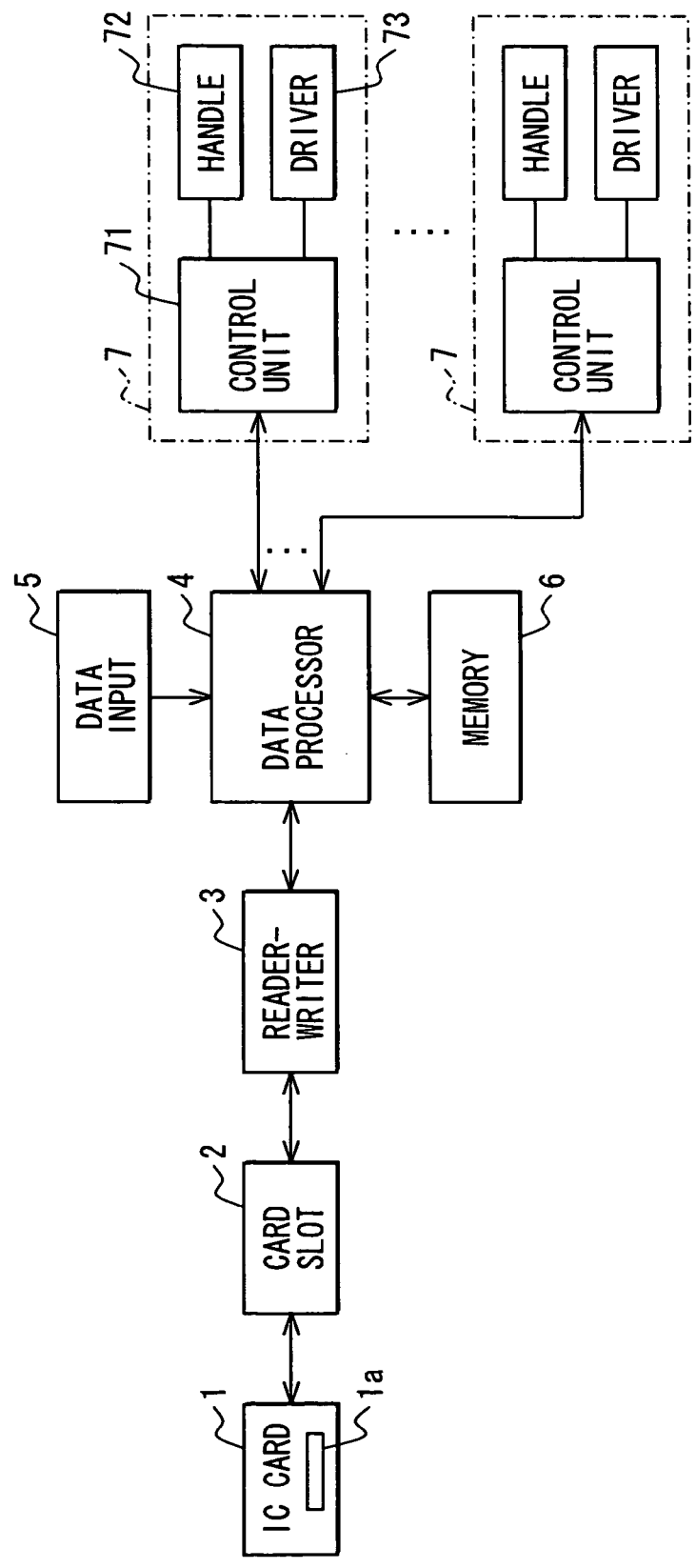
FIG. 1 is a block diagram of a vehicle accessory adjusting system according to the first embodiment of the invention.

As shown in FIG. 1, the vehicle accessory adjusting system according to the first embodiment of the invention includes an IC card 1, a card slot unit 2, a reader-writer 3, a data processor 4, a data input unit 5, a setting data memory 6, and various on-vehicle devices 7 such as movable seats and mirrors.

The IC card 1 is constituted of a resinous card member and a one-chip microcomputer with a nonvolatile rewritable memory 1a such as an EEPROM or a flash memory that is embedded into the resinous card member. The IC card 1 stores personal data of a card user's using a plurality of on-vehicle accessories of a vehicle. The card slot unit 2 is fixed at a portion of a instrument panel of a vehicle to directly or indirectly communicate with the IC card 1. The reader-writer 3 is controlled by the data processor 4 to read data from or write or rewrite data into the memory 1a of the IC card 1. The data processor 4 includes a microcomputer to function as the central processing unit of the vehicle accessory adjusting system. The data input unit 5 includes various sensors and an ignition switch to provide operation data. The setting data memory 6 stores setting data for setting on-vehicle accessories of various types of vehicles such as seats and mirrors at their standard positions. The data processor 4 reads or writes the IC card 1 based on the operation data sent from the data input unit 5 and the setting data sent from the setting data memory 6.

The vehicle accessory adjusting system according to the invention can be mounted in any of a plurality of types of vehicles. The setting data of various types of vehicles are obtained from tests or experiments and stored into the setting data memory 6 beforehand. The personal data are obtained when a user adjusts some of the accessories to suit his feelings.

The setting data memory 6 has a data table in which standard data on various accessories of a plurality of types of vehicles or basic data and deviation or offset data of the vehicle accessories are stored. Such data are selected from a large amount of crude data obtained from result of tests or experiments on various types of vehicles and persons. The mean values or central values of the crude data may be used for the standard data.

On the other hand, the memory 1a of the IC card 1 stores personal data on adjusting various accessories to a user and standard data thereof. The standard data may be replaced with combinations of basic values and offset values relative to the basic values. The stored personal data may be data on respective accessories of a vehicle that the user has first set.

Incidentally, it has been found that the offset values to the standard values do not change much among different types of vehicles.

Figure 2:
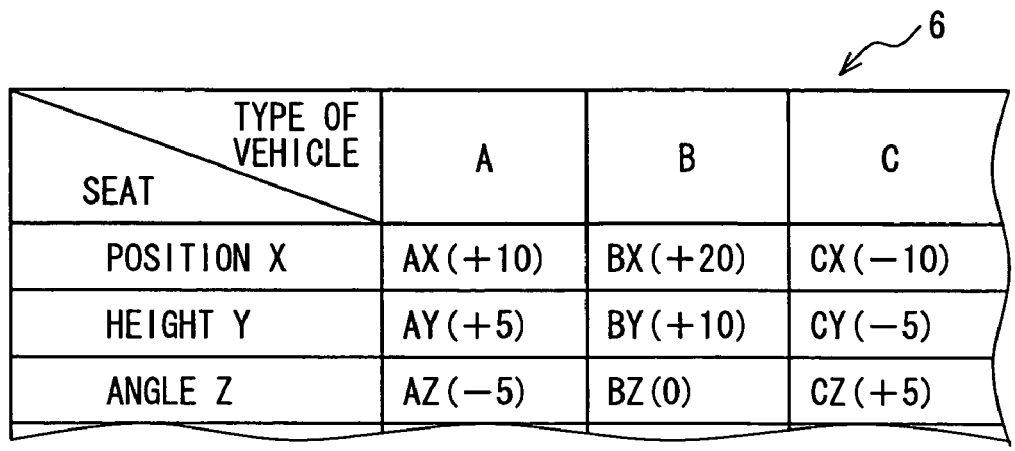
FIG. 2 is a data table of seat positions stored in a memory of the vehicle accessory adjusting system according to the first embodiment.
Figure 3:
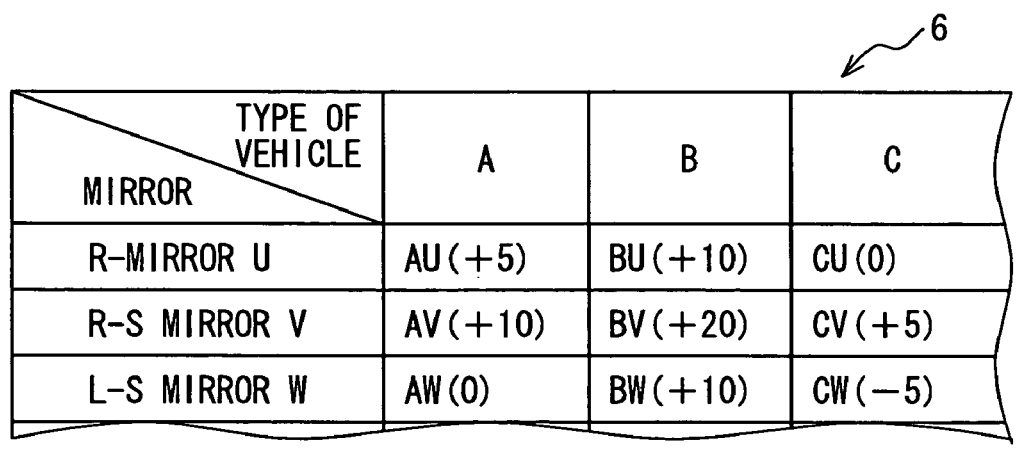
FIG. 3 is a data table of mirror positions stored in the memory of the vehicle accessory adjusting system according to the first embodiment.

As shown in FIGS. 2 and 3, seat setting data include a seat position (of moving direction) X, seat height Y, and a seatback angle Z. Standard offset values for respective seat positions (AX, BX, CX, etc.) of various types of vehicles such as A (sedan), B (wagon), C (sport), etc. from basic values of the seat data are respectively stored, as indicated in parenthesis in a table. Mirror data include a room mirror angle U, a right side-mirror angle V, and a left side-mirror angle W. Standard offset values for respective mirror positions (AU, BU, CU, etc.) of various types of vehicles A (sedan), B (wagon), C (sport), etc. from basic values of the mirror data are respectively stored, as indicated in parenthesis in a table.

The on-vehicle devices 7 are devices for adjusting positions, angles or the like of accessories such as the seats, and the mirrors, a steering wheel. The on-vehicle device 7 may also adjust room temperature, air conditions, ventilation, deodorization, illuminations, cruise control conditions, safety devices, guiding monitors, information service system such as a navigation display system, a meter system or radio broadcasting information system, an audio-video entertainment devices, a hands-free telephone system, an emergency communication system (MAYDAY), etc. Each on-vehicle device 7 includes a control unit 71, a handle (button or dial) 72 and a drive unit 73.

The operation of the vehicle accessory adjusting system will be described with reference to FIGS. 4 and 5.

At first, whether the IC card 1 is inserted into the slot member 2 or not is examined at step S101. If the result is YES, whether an ID code of the IC card 1 and an authenticated ID code store in the accessory adjusting system tally with each other or not is examined at S102. Instead of the authenticated code stored in the accessory adjusting system, a user can directly input the ID code to the data input unit 5. Subsequently, the personal data are read from the IC card's memory 1a at S103 to examine whether personal data for setting one or some accecessories such as a seat or mirrors are stored in the IC card's memory or not at S104.

If the result of S104 is YES, one or some of the on-vehicle devices 7 is or are controlled to set or adjust the one or some accessories at S105. If, on the other hand, the result is NO, all the accessories are set by the on-vehicle devices 7 according to the standard data at S106.

Thereafter, whether or not a user manipulates one or some of the handles 72 to adjust one or some of the accessories or changes setting data although they have been set according to the personal data or the standard data is examined at S107 to go to S108 if the result is YES, where whether time to rewrite setting data or not is examined to rewrite the setting data stored in the IC card's memory 1a at S109 if the result of S108 is YES. Incidentally, the rewriting of the personal data into the IC card's memory 1a is usually carried out just after an ignition key switch is turned off or when a user instructs the rewriting. For example, an instruction switch is provided so that the rewriting can be carried out whenever the user turns on the switch. The rewriting can be carried out via an operation panel of another system such as a navigation system. This information is inputted to the data processor 4 by the data input unit 5.

Figure 5:
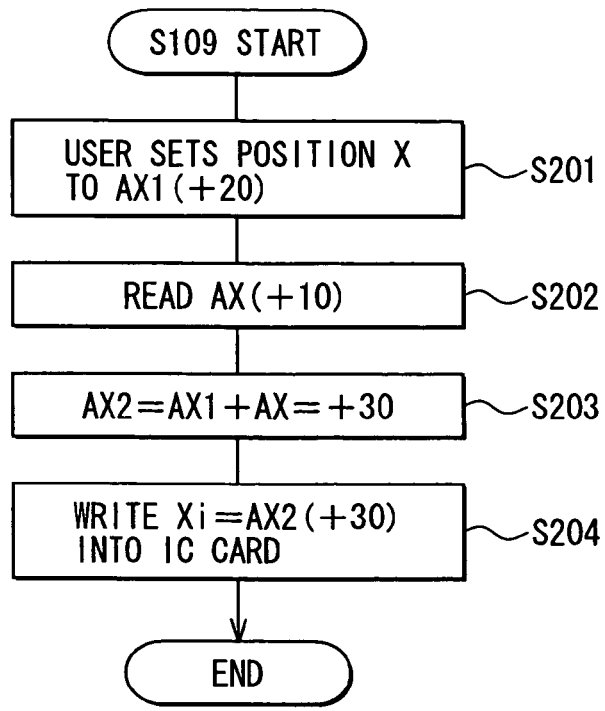
FIG. 5 is a flow diagram showing a rewriting process of the IC card's memory.

When the user manipulates the handle 72 of the seat adjusting on-vehicle devices 7 to set seat position X of a vehicle of type A to AX1 (+20) at S201, as exemplified by a flow diagram shown in FIG. 5, a standard offset value AX (+10) is read from a data table of the memory 6 at S 202. At the next step S 203, a specific offset value AX2 (+30) is calculated based on the data at the precedent steps: AX2=AX1+AX=30

Thereafter, the specific offset value AX2 is rewritten as a personal data value Xi to be stored in the IC card's memory 1a at S204, as shown in FIG. 7.

Figure 4:
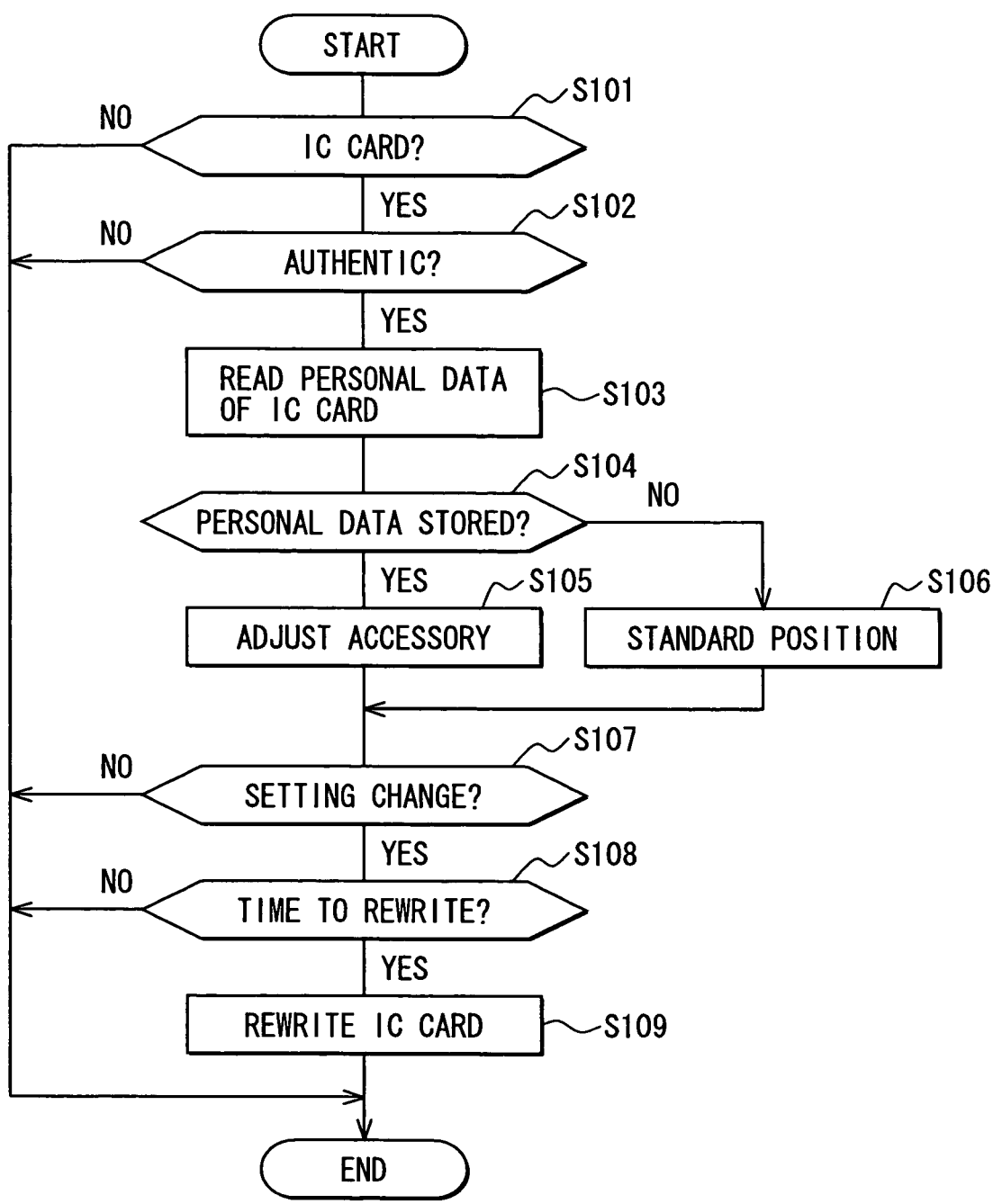
FIG. 4 is a flow diagram showing a setting process of the IC card's memory for a vehicle A.

When the same user drives a vehicle of type B and insert the IC card 1 into the slot member 2, the same steps as described with reference to FIG. 4 are carried out.

Figure 6:
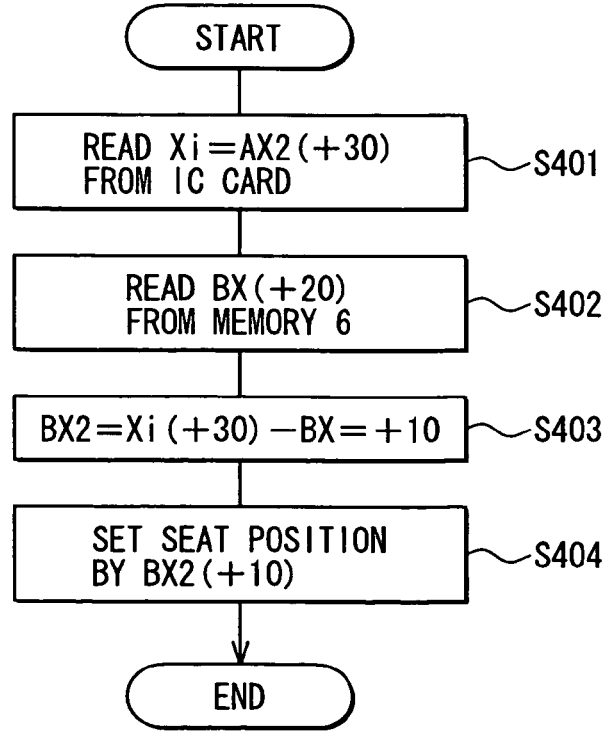
FIG. 6 is a flow diagram showing a rewriting process of the IC card's memory.

Thereafter, the step goes to S401 shown in FIG. 6, where the personal data value Xi (30) is read from the seat position data table K1 of the IC card's memory 1a. Subsequently, a standard offset value BX (20) is read from a seat position data table of the setting data memory 6 at S402. At the next step S403, a specific offset value BX2 (30) is calculated based on the data at the precedent steps: BX2=Xi−BX=+10

Subsequently, the seat position X is set to BX2 (10) at S404.

The above setting is carried out on the assumption that the specific offset values do not widely change even if the type of vehicle changes. Therefore, it is not necessary to store all the data for a plurality of types of vehicles in the IC card's memory.

A vehicle accessory adjusting system according to the second embodiment of the invention will be described with reference to FIG. 8. Incidentally, the same reference numeral will indicate the same or substantially the same part, portion of component as the first embodiment hereafter.

Figure 8:
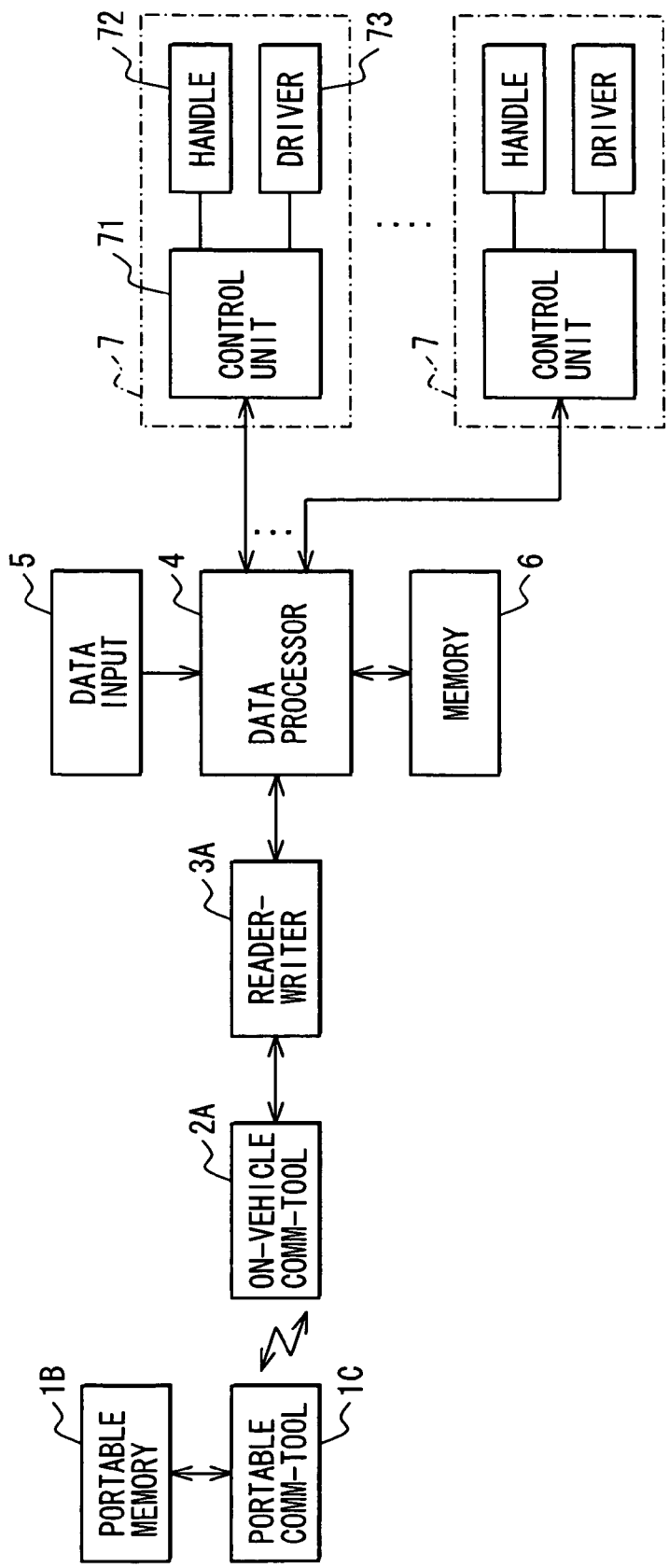
FIG. 8 is a block diagram of a vehicle accessory adjusting system according to the second embodiment of the invention.

As shown in FIG. 8, the vehicle accessory adjusting system according to the second embodiment of the invention includes a memory 1B of a portable communication tool 1C such as mobile phone, an on-vehicle communication tool 2A, a reader-writer 3A, a data processor 4, a data input unit 5, a setting data memory 6, and on-vehicle devices 7. The memory 1B is not required to be separated from the portable communication tool 2A. The memory 1B may be a flash memory of a built-in connector type, a stick type or the like.

The communication between the portable communication tool 1C and the on-vehicle communication tool 2A can be achieved by means of radio waves (e.g. Bluetooth), lights, ultrasonic waves.

Figure 11:
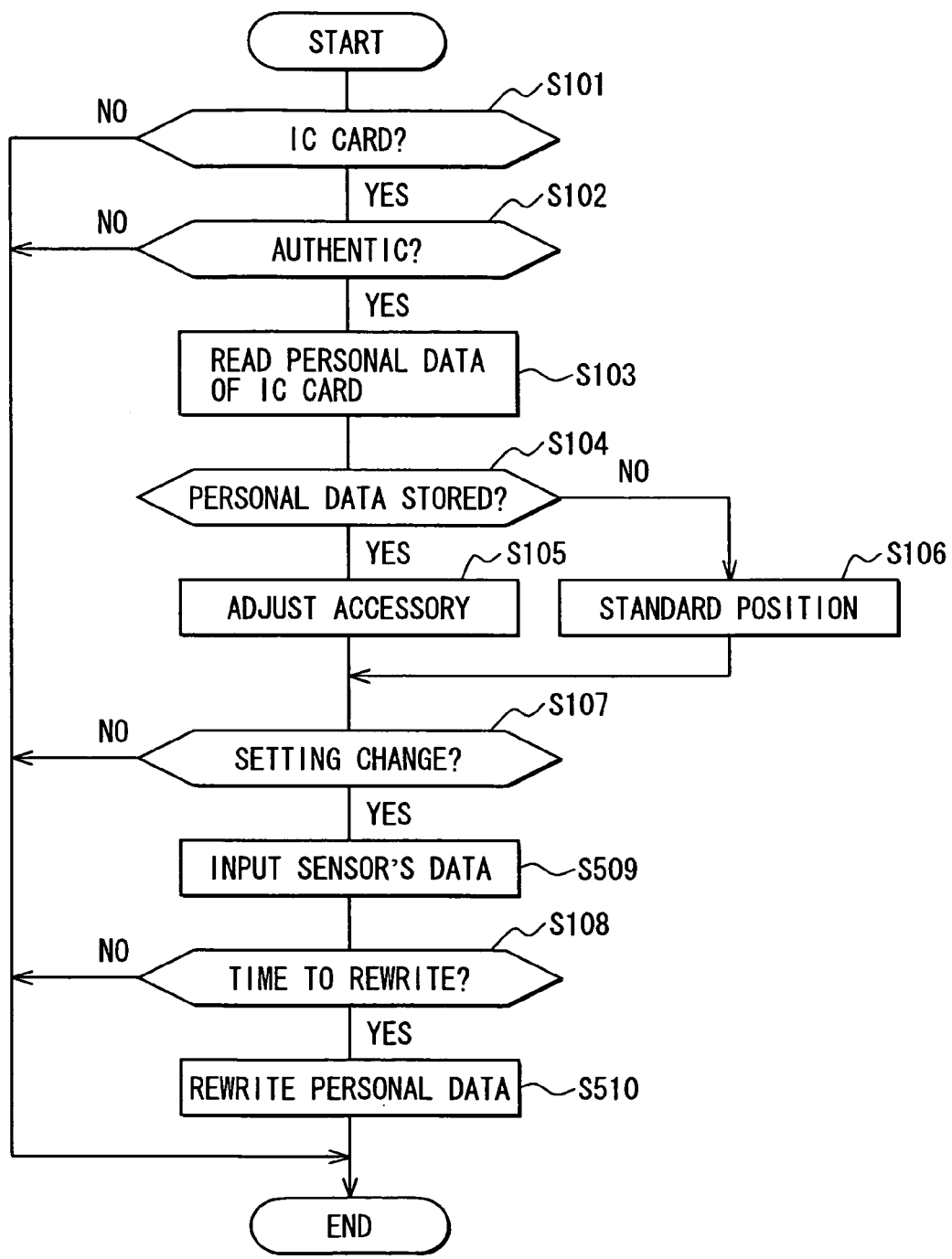
FIG. 11 is a flow diagram showing a setting process of a memory of an IC card to be used for the accessory adjusting system according to the third embodiment.

A vehicle accessory adjusting system according to the third embodiment of the invention will be described with reference to FIGS. 9-11.

Figure 9:
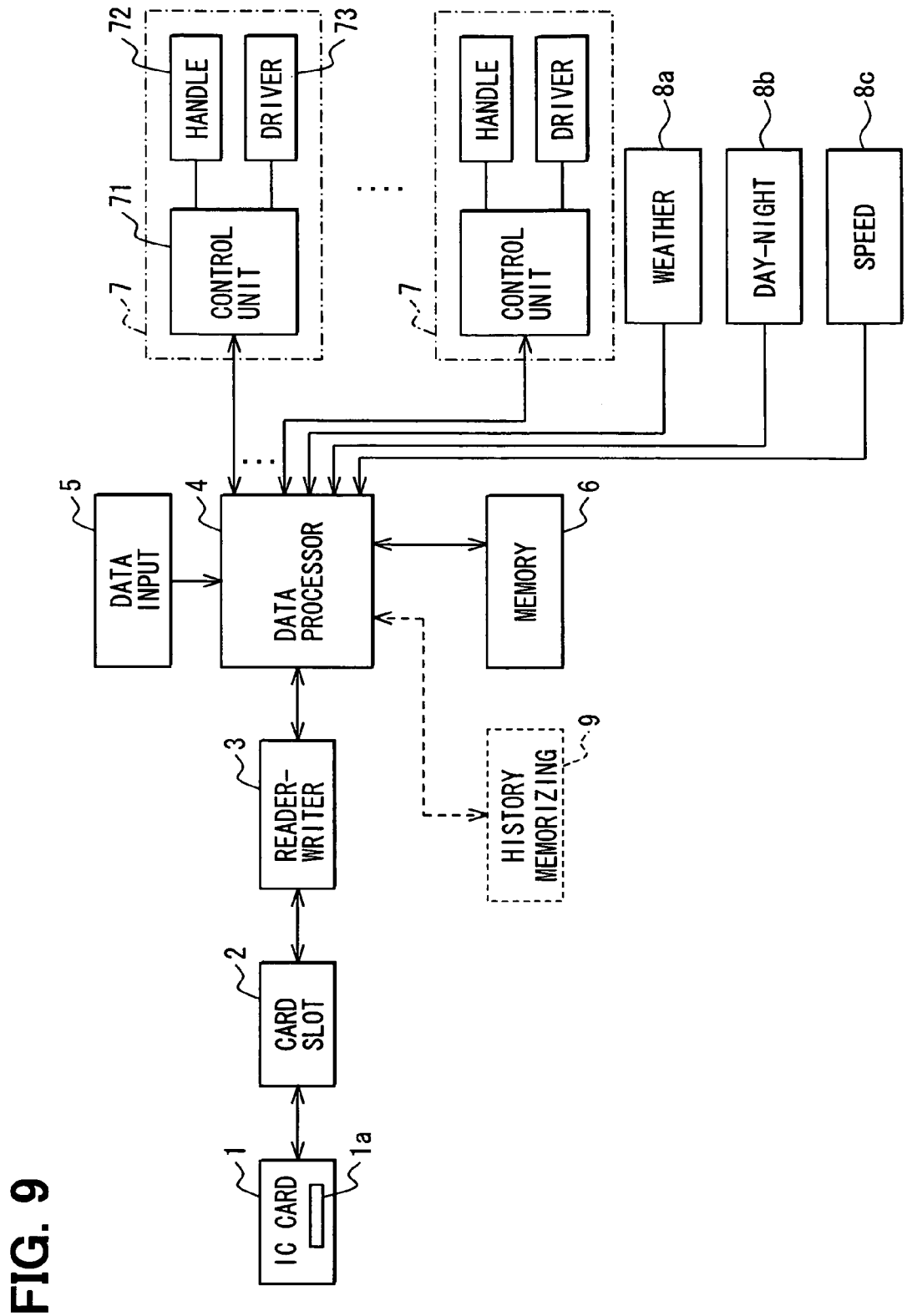
FIG. 9 is a block diagram of a vehicle accessory adjusting system according to the third embodiment of the invention.

As shown in FIG. 9, the vehicle accessory adjusting system according to the third embodiment of the invention includes the following drive condition sensors: a weather sensor 8a, a day-time-night-time sensor and a vehicle speed sensor 8c, in addition to the IC card 1, the card slot unit 2, the reader-writer 3, the data processor 4, the data input unit 5, the setting data memory 6, and the on-vehicle devices 7. As shown in FIG. 10, the memory 1a of the IC card 1 stores personal data on various drive condition modes of adjusting various accessories. For example, the memory 1a has a seat position data table in which personal data values (Xi1-Xi4, Yi1-Yi4, Zi1-Zi4) of the seat position X, the seat height Y and the seat angle Z are stored for each of a plurality of drive condition modes, such as a standard mode 1, a rain mode 2, a night mode 3 and a high speed mode 4. The plurality of drive condition modes may include a rainy night mode or other combined modes. If two or more drive condition modes are applicable at the same time, a drive condition mode of a higher priority may be selected.

When the use drives a vehicle of type A, the IC card 1 is first inserted into the slot member 2. Then, substantially the same steps as described with reference to FIG. 4 are carried out until S107.

At the next step S509, data provided by the sensors 8a, 8b, 8c are inputted to go to the next step S108, where whether time to rewrite setting data or not is examined to rewrite the personal data for a selected mode of the IC card's memory 1a at S510 if the result of S108 is YES.

A vehicle accessory adjusting system according to the fourth embodiment of the invention will be described with reference to FIGS. 9, 11 and 12.

As indicated by a block of a broken line in FIG. 9, the vehicle accessory adjusting system according to the fourth embodiment of the invention further includes a history memorizing unit 9 that has a learning function.

The operation of this embodiment includes the substantially same steps as the third embodiment except the step S510, which includes steps S601, S602 and S603, as shown in FIG. 12.

The history memorizing unit 9 memorizes a set of drive condition mode data that are provided based on the signal data detected by the sensors 8a, 8b, 8c and corresponding setting data (or specific offset value) of the memory 6 in a chronological order at step S601. That is, a predetermined number of the data or the data that are obtained for a predetermined period of time are memorized.

Subsequently, a set of the most frequently applied setting data that correspond to a selected drive condition mode are selected from the memorized setting data at S602 to rewrite the IC card's memory 1a with the selected setting data corresponding to the selected mode at S603.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle accessory adjusting system for adjusting a plurality of on-vehicle accessories of a vehicle of one type to suit an individual according to personal data stored in a portable data storage medium, said vehicle accessory adjusting system comprising:

memory means for storing standard setting data on the on-vehicle accessories of a plurality of different types of vehicles that includes the vehicle of one type and a specific vehicle;

setting means for setting the on-vehicle accessories of the vehicle of one type according to the personal data stored in the portable data storage medium and the standard setting data;

calculation means for calculating data based on specific setting data obtained when the individual uses at least one of the on-vehicle accessories of the vehicle of one type and one of the stored standard setting data that correspond to at least one of the on-vehicle accessories; and rewriting means for rewriting the personal data stored in the portable data storage medium with the data that is calculated;

wherein:

said portable data storage medium stores specific offset values relative to the standard setting data of the specific vehicle from the standard setting data of the plurality of vehicles of different types as the personal data; and said setting means sets the on-vehicle accessories of the vehicle of one type according to the standard setting data and the offset values of the vehicle of one type from the standard setting data of the specific vehicle.

2. The vehicle accessory adjusting system as claimed in claim 1, wherein said plurality of on-vehicle accessories includes a vehicle seat operating unit.

3. The vehicle accessory adjusting system as claimed in claim 1, wherein said plurality of on-vehicle accessories includes a vehicle mirror operating unit.

4. The vehicle accessory adjusting system as claimed in claim 1, wherein said portable data storage medium is a memory card.

5. The vehicle accessory adjusting system as claimed in claim 1, further comprising drive-condition-mode-sensing means for providing a plurality of drive condition modes, wherein:
said memory means stores standard setting data that correspond to the drive condition modes; and
said setting means sets the on-vehicle accessories according to the personal data stored in the portable storage medium, the standard setting data and the drive condition modes.

6. The vehicle accessory adjusting system as claimed in claim 5, further comprising:
history memory means for memorizing data on the drive condition modes and corresponding setting data in a chronological order; and
selection means for selecting setting data that correspond to one of the drive condition modes.

7. The vehicle accessory adjusting system as claimed in claim 6, wherein said selection means selects the most frequently applied setting data.

8. A vehicle accessory adjusting system for adjusting an on-vehicle accessory of a vehicle of one type comprising:
an IC card having a personal data memory for storing personal data;
a reader-writer controlled by said data processor to read personal data from or write the personal data into the personal data memory of said IC card;
setting data memory storing standard setting data on the on-vehicle accessory of a plurality of different types of vehicles that includes the vehicle of one type and a specific vehicle;
an accessory controller having a controller, a handle and a driver, said accessory controller setting the on-vehicle accessory according to the personal data stored in the portable storage medium and the standard setting data stored in the setting data memory;
a data processor for controlling said reader writer, said setting data memory and said accessory controller; wherein:
said personal data memory of said IC card stores specific offset values relative to the standard setting data of said specific vehicle from the standard setting data of the plurality of vehicles of different types as the personal data; and
said data processor calculates data when the individual sets the on-vehicle accessories by the handle, thereby to control said reader-writer to renews the personal data stored in the portable data storage medium with the data that is calculated.

9. A method of adjusting a plurality of on-vehicle accessories of a vehicle of one type to suit an individual according to personal data stored in a portable data storage medium, said method comprising:
storing specific offset values relative to standard setting data of a specific vehicle from a plurality of vehicles of different types that include said vehicle of one type and said specific vehicle as the personal data in said portable data storage medium;
storing standard setting data on the on-vehicle accessories of the plurality of vehicles of different types into a memory disposed in a vehicle;
setting the on-vehicle accessories according to the offset values of the personal data stored in the portable storaae medium and the standard setting data;
calculating data based on specific setting data obtained when the individual uses at least one of the on-vehicle accessories and one of the stored standard setting data that correspond to at least one of the on-vehicle accessories of the vehicle of one type and;
rewriting the personal data stored in the portable data storage medium with the data that is calculated.

10. The method as claimed in claim 9, wherein said portable data storage medium is a memory card.

11. The method as claimed in claim 9, further comprising:
providing a drive-condition-mode-sensor for providing a plurality of drive condition modes,
wherein: said storing comprises storing standard setting data that correspond to a plurality of vehicle drive condition modes.

12. The method as claimed in claim 11, further comprising:
memorizing data on the drive condition modes and corresponding setting data in a chronological order; and
selecting most frequently applied setting data from the setting data that correspond to one of the drive condition modes.

* * * * *